United States Patent [19]

Tzikas et al.

[11] Patent Number: 5,041,539

[45] Date of Patent: Aug. 20, 1991

[54] PREPARATION OF AQUEOUS CONCENTRATES OF YELLOW AZO AND AZOXYSTILBENE DYES UTILIZING ALKANOLAMINE SALTS

[75] Inventors: Athanassios Tzikas, Pratteln; Paul Herzig, Basel; Jürgen Markert, Ettingen, all of Switzerland

[73] Assignee: Ciba-Geigy Corporation, Ardsley, N.Y.

[21] Appl. No.: 370,089

[22] Filed: Jun. 19, 1989

Related U.S. Application Data

[63] Continuation of Ser. No. 795,045, Nov. 4, 1985, abandoned.

[30] Foreign Application Priority Data

Nov. 12, 1984 [CH] Switzerland .......................... 5406/84

[51] Int. Cl.$^5$ ..................... C09B 27/00; D21H 21/28
[52] U.S. Cl. .................................... 534/572; 534/571; 534/585; 534/689; 534/728; 534/887
[58] Field of Search ............... 534/728, 689, 887, 571, 534/572

[56] References Cited

U.S. PATENT DOCUMENTS 3,679,353  7/1972  Streck ................................. 534/728
4,560,745 12/1985  Weberndoerfer et al. ..... 534/887 X

FOREIGN PATENT DOCUMENTS 0021619 1/1981 European Pat. Off. ............ 534/887
0053220 1/1984 European Pat. Off. ............ 534/887

OTHER PUBLICATIONS

Kawasaki et al., Chemical Abstracts, vol. 86, #191321p (1977).
Sumitomo, Chemical Abstracts, vol. 96, No. 36800g (1982).

*Primary Examiner*—Mary C. Lee
*Assistant Examiner*—Fiona T. Powers
*Attorney, Agent, or Firm*—George R. Dohmann; Edward McC. Roberts

[57] ABSTRACT

The invention relates to a process for the preparation of concentrated storage-stable aqueous solutions of yellow azo- and azoxystilbene dyes which are obtained by self-condensation of 4-nitrotoluene-2-sulfonic acid in the presence of an alkali metal hydroxide, by converting the sparingly soluble alkali metal salt of the dye into a water-soluble ammonium salt by double cation exchange via a lipophilic ammonium salt, which process comprises carrying out the double ion exchange in a two-phase system of nitrobenzene/water and using, for the first ion exchange a di- or trialkylamine containing a total of 12 to 40 carbon atoms and, for the second ion exchange, a mono-, di- or trialkanolamine containing 2 to 4 carbon atoms in each alkyl moiety.

The concentrated storage-stable dye solutions so obtained are particularly suitable for dyeing paper.

8 Claims, No Drawings

PREPARATION OF AQUEOUS CONCENTRATES OF YELLOW AZO AND AZOXYSTILBENE DYES UTILIZING ALKANOLAMINE SALTS

This application is a continuation of application Ser. No. 06/795,045, filed Nov. 4, 1985, abandoned.

The present invention relates to a process for the preparation of concentrated storage-stable aqueous dye solutions containing a mixture of yellow azo- and azoxystilbene dyes, to the dye solutions so obtained, and to the use thereof.

The self-condensation of 4-nitrotoluene-2-sulfonic acid, which leads in simple manner to yellow azo- and azoxystilbene dyes, has long been known (commercial preparatory methods are described in BIOS Report 1548). These dyes are substantive dyes which are used in particular for dyeing paper. The most important of them is known as C.I. Direct Yellow 11.

It is known that the condensation of 4-nitrotoluene-2-sulfonic acid in the presence of sodium hydroxide solution results in the formation of insufficiently water-soluble sodium salts of the azo- and azoxystilbene dyes. Concentrated aqueous solutions which are used with advantage for e.g. the dyeing of paper in the pulp cannot be prepared from these salts, as their solubility in water is only about 1 g/100 ml. There has therefore been no lack of attempts to carry out the condensation in such a manner that the dye is obtained direct in the form of a concentrated aqueous solution.

German Offenlegungsschrift No. 16 44 308 describes a process in which the condensation using the lithium salt of 4-nitrotoluene-2-sulfonic acid as starting material is carried out in the presence of lithium hydroxide as base, affording the dye in the form of a highly concentrated and very readily water-soluble paste. The lithium salts of the azo- and azoxystilbene dyes so obtained are not only very readily water-soluble, but also have greater substantivity compared with the sodium salts. However, the lithium salts have the drawback that they do not form stable dye solutions. Instead, the concentrated solutions have a propensity during storage to gel formation, crystallisation or flocculation, so making it difficult or even impossible to use them.

The proposal is made in German Offenlegungsschrift No. 28 20 487 to carry out the base-catalysed self-condensation of 4-nitrotoluene-2-sulfonic acid in the presence of reaction products of ammonia and ethylene oxide and sodium or lithium hydroxide, and, in German Offenlegungsschrift 30 46 450, in the presence of a primary, secondary or tertiary amine and lithium hydroxide. At least some of the sulfo groups of the azo- and azoxystilbene dyes obtained in this manner are in the form of alkali salts.

The condensation of 4-nitrotoluene-2-sulfonic acid in the presence of sodium hydroxide and alkanolamines, in aqueous/alcoholic medium, is disclosed in German Offenlegungsschrift No. 31 10 261. In this process, storage-stable dye solutions are obtained on account of the organic solvent. The drawback is, however, that these formulations contain a relatively high concentration of organic solvents such as glycol ethers and thus lead to severe wastewater pollution after paper dyeing.

European published patent application No. 122 224 relates to a process for the preparation of concentrated aqueous solutions of azo- and azoxystilbene dyes, which comprises carrying out the base-catalysed condensation of 4-nitrotoluene-2-sulfonic acid in the presence of a mixture of a $C_2$–$C_4$ monoalkanolamine and a di- or trialkanolamine, and removing the inorganic salts from the dye solution. Accordingly, in this process it is necessary to remove the inorganic salts by e.g. a membrane separation process.

A method of preparing dyes of low electrolyte content is disclosed in European published patent application No. 53 220, wherein the dye is initially converted into a lipophilic amine salt in order to separate it from the salt-containing synthesis solution. The diethanolammonium salt of the dye is subsequently prepared by addition of diethanolamine and the lipophilic amine is recovered. When applied to azo- and azoxystilbene dyes, this process has the disadvantage that no good phase separation is obtained, so that loss of dye occurs and, in addition, washing of the organic phase is complicated.

Finally, European published patent application No. 21 619 discloses a process for the preparation of concentrated aqueous solutions of dyes that contain sulfo groups, wherein the respective dye is converted into an amine salt which is extracted with an organic solvent. Cation exchange is subsequently effected with a base, e.g. ammonia, lithium hydroxide or a water-soluble amine, and the dye is extracted from the organic phase into the aqueous phase. The organic solvent employed is preferably toluene or a mixture of toluene and butyl acetate. In this process too, no optimum phase separation is obtained and the amine salt does not dissolve completely in the organic phase, so giving rise to losses of dye and to technical problems.

It is the object of the present invention to provide a process which can be easily carried out and in which concentrated aqueous solutions of azo- and azoxystilbene dyes are obtained, which solutions are storage-stable and substantially free from organic solvents and inorganic salts.

It has been found that such dye solutions are obtained by converting the dye obtained by self-condensation of 4-nitrotoluene-2-sulfonic acid in the presence of an alkali metal hydroxide, in a two-phase system consisting of nitrobenzene/water, into a readily water-soluble alkanolammonium salt by double cation exchange via a lipophilic ammonium salt.

Accordingly, the invention relates to a process for the preparation of concentrated storage-stable aqueous solutions of yellow azo- and azoxystilbene dyes which are obtained by self-condensation of 4-nitrotoluene-2-sulfonic acid in the presence of an alkali metal hydroxide, by converting the sparingly soluble alkali metal salt of the dye into a water-soluble alkanolammonium salt by double cation exchange via a lipophilic ammonium salt, which process comprises carrying out the double ion exchange in a two-phase system of nitrobenzene/water and using, for the first ion exchange a di- or trialkylamine containing a total of 12 to 40 carbon atoms and, for the second ion exchange, a mono-, di- or trialkanolamine containing 2 to 4 carbon atoms in each alkyl moiety.

The process of this invention thus comprises for example treating the dye obtained by self-condensation of 4-nitrotoluene-2-sulfonic acid in the presence of an alkali metal hydroxide, in the form of an aqueous suspension or solution which is preferably acidic (a start may be made direct from the preferably acidified reaction mixture, from the moist filter cake or from the already dried dye, in which last case the dye must be moistened again with water), with the di-or trialkylamine and nitrobenzene, separating the organic phase that contains the amine salt of the dye, extracting the organic phase with alkanolamine and water, and separating the aqueous phase that contains the dye. Any residual amine and nitrobenzene may be removed, e.g. by steam distillation.

By using nitrobenzene as organic phase, a good phase separation between aqueous and organic phase is rapidly obtained during the formation of the lipophilic ammonium salt as well as of the alkanol-ammonium salt. Owing to the advantageous density differences, the nitrobenzene phase can also be readily washed free of salts. A virtually salt-free dye solution affords in turn the best conditions for obtaining a highly concentrated commercial formulation, for even insignificant amounts of salt appreciably diminish the solubility of the azo- and azoxystilbene dyes.

The di- and trialkylamines containing 12 to 40 carbon atoms in the alkyl moieties and used for the first cation exchange reaction may be for example the following compounds: didecylamine, dioctadecylamine, di-2-ethylhexylamine, and tributylamine, trihexylamine, dimethyloctadecylamine, methyldidecylamine, tridodecylamine, methyldioctylamine, tri-n-octylamine or tri-2-ethylhexylamine. In stead of the pure compounds, it is also possible to use mixtures of amines, in particular of fatty amines, e.g. coconut fatty amine and tallow fatty amine. Trialkylamines are preferred, namely those containing a total of 12 to 25 carbon atoms, in particular tributylamine and tri-n-octylamine.

After the first cation exchange reaction, the dye is present as lipophilic di- or trialkylammonium salt in the nitrobenzene phase. The salt-containing aqueous phase is separated and the dye is converted by a further cation exchange reaction into a readily water-soluble salt, namely into a mono-, di- or trialkanolammonium salt containing 2 to 4 carbon atoms in each alkyl moiety. Examples of suitable $C_2$–$C_4$ monoalkanolamines for this reaction are: ethanolamine, n-propanolamine, 1-aminopropanolamine, n-butanolamine, 2-amino-1-butanol or 2-hydroxyethoxyethylamine. Eligible $C_2$–$C_4$ dialkanolamines are diethanolamine or diisopropanolamine; and suitable $C_2$–$C_4$ trialkanolamines are triethanolamine or triisopropanolamine. In stead of the pure compounds it is also possible to use mixtures of alkanolamines, especially as in this way the shade of the azo- and azoxystilbene dyes can be varied within certain limits - from a reddish yellow to a greenish yellow. For the second cation exchange reaction it is preferred to use a $C_2$–$C_4$ dialkanolamine, in particular diethanolamine.

The preferred azo- and azoxystilbene dye used in the process of this invention is known as C.I. Direct Yellow 11.

The process of the present invention, including the preparation of the sparingly soluble alkali metal salt of the dye, may be carried out for example as follows: 4-nitrotoluene-2-sulfonic acid is added to an alkali metal hydroxide solution, e.g. potassium hydroxide solution, preferably sodium hydroxide solution. The amount of alkali metal hydroxide may vary within wide limits, but a 2- to 4-fold molar excess, based on 4-nitrotoluene-2-sulfonic acid, will normally be used, as in addition to the starting compound, the sulfuric acid residues attaching to the crude sulfonic acid have to be neutralised. The condensation is carried out e.g. in a pH range from about 11 to 13 and in the temperature range from 60° to 80° C. Once the self-condensation of the 4-nitrotoluene-2-sulfonic acid is sufficiently far advanced (after about 5 to 8 hours), the reaction mixture is initially diluted with water and then acidified, e.g. with sulfuric acid. Nitrobenzene and the di- or trialkylamine, e.g. tributylamine or trioctylamine, are then added to the acid dye solution, and the two-phase system that forms is thoroughly mixed for about 15 minutes to 1 hour in the temperature range from 60° to 80° C. The amount of amine is so chosen that the azo- or azoxystilbene dye is converted completely into the corresponding ammonium salt. It is advantageous to use, based on the sulfo groups of the dye, an equimolar amount plus a slight excess, which may be up to 10% of the molar amount. The amount of nitrobenzene added is such that, after mixing, the two phases separate as rapidly and as completely as possible. It is convenient to use 2 to 5 parts of nitrobenzene per 10 parts of water. After the dye has been completely converted into the corresponding ammonium salt, the nitrobenzene phase is separated and desirably washed once or twice with water. Inorganic salts can thus be readily removed. Water and the alkanolamine, e.g. diethanolamine, are then added to the nitrobenzene phase that contains the dye, and the batch is thoroughly mixed for 1 to 3 hours in the temperature range from 60° to 80° C., whereupon the hydrophilic ethanolammonium salt, e.g. diethanolmmonium salt, forms from the lipophilic ammonium salt of the dye, and the dye transfers from the nitrobenzene phase to the aqueous phase. The alkanolamine is also conveniently employed in equimolar amount with a slight excess (up to 10%). A good phase separation between aqueous and organic phase is also obtained in this second cation exchange and the aqueous phase that contains the dye can be readily separated. Residual amine and nitrobenzene can be easily removed from the aqueous dye solution by steam distillation.

Finally, if necessary, the dye solution can be freed from impurities by filtration and adjusted to commercial tinctorial strength by concentrating it, e.g. by means of a membrane separation process, or by diluting it. The ready for use concentrated dye solution so obtained is perfectly stable, even on prolonged storage, and has no propensity to thicken.

The amine-containing nitrobenzene phase can be used direct for a new batch without any purification operations, if desired after addition of the amount of amine that has been lost in the aqueous phase. A dye formulation of uniform quality is obtained even after repeated use of the amine/nitrobenzene mixture.

The dye solutions prepared by the process of this invention may contain small amounts of further assistants such as formamide, dimethylformamide, glycol, diethylene and triethylene glycol as well as the mono- and dialkyl ethers thereof, or also polyalkylene glycols with a molecular weight of 400 to 4000, or also benzyl alcohol or urea. These assistants are conveniently added to the neutral and desalted dye solution.

The dye solutions of this invention are preferably used for dyeing sized or unsized paper in the pulp. However, they may also be used for dyeing paper by the immersion method and in the size press. Using the dye solutions of this invention for dyeing paper in the pulp the wastewater of the paper manufacture is not or only insignificantly coloured. The dye shows a high substantivity to the cellulose fibre. The dyes do not mottle and do not lead to two-sideness (i.e. to differently coloured sides of the paper sheet). The dyings obtained on paper have good lightfastness -the shade changes to tone-in-tone on prolonged exposure to light - and, in particular, good wetfastness properties.

The invention is illustrated by the following Examples, in which parts and percentages are by weight.

EXAMPLE 1

A glass flask is charged with 800 parts of water and then 12 parts of solid sodium hydroxide are added such that the temperature does not exceed 60° C. To the warm sodium hydroxide solution of 55°-60° C. are then added 217 parts of 4-nitrotoluene-2-sulfonic acid over about 5 minutes. The temperature is then raised to 74° C. over 1 hour and 100 parts of water are added dropwise over a further hour. The pH of the reaction mixture is over 12. The mixture is stirred for 4 hours at 70°-75° C. and then addition is made of 650 parts of water and then, over 20 to 30 minutes, of 150 parts of concentrated sulfuric acid. The reaction mixture, the pH of which has fallen to below 4 when the addition of sulfuric acid is complete, is stirred at elevated temperature for another 30 minutes. A mixture of 467 parts of nitrobenzene and 200 parts of tributylamine are then added and the batch is stirred for 30 minutes at 70° C.

The nitrobenzene phase separates at once when stirring is discontinued. The heavier nitrobenzene phase containing the tributylammonium salt of the dye is run off, then treated with a mixture of 350 parts of water and 108 parts of diethanolamine, and the batch is stirred for about 2 hours at c. 70° C. At the conclusion of the second cation exchange reaction, the dye is in the aqueous phase in the form of the diethanolammonium salt. The aqueous phase is separated and freed from residual tributylamine and nitrobenzene by steam distillation. After it has cooled, the dye solution is clarified by filtration through a folded filter, affording 820 parts of a concentrated, storage stable ready for use dye solution.

EXAMPLE 2

The procedure of Example 1 is repeated, using the equivalent amount of tri-n-octylamine instead of tributylamine. A concentrated, storage stable solution of the dye employed is also obtained.

EXAMPLE 3

10 g of bleached cellulose are put into 500 ml of water of pH 7 and soaked for 30 minutes. After stirring for 30 minutes, 2.5 g of the dye solution obtained in either Example 1 or 2 are added. Stirring is continued for 15 minutes to ensure uniform mixing and the liquor is bulked to 700 ml with water of pH 7. Sheet formation is carried out with this liquor. The paper so obtained is dyed in a deep yellow shade of good wetfastness properties.

What is claimed is:

1. A process for preparing and concentrating storage-stable aqueous solutions of azo- or azoxystilbene dyes which comprises:
   (a) self-condensing 4-nitrotoluene-2-sulfonic acid in an alkaline solution of an alkali metal hydroxide;
   (b) acidifying the reaction mixture of step (a) after the condensation reaction is substantially complete;
   (c) conducting a first cation exchange by adding to the acidified mixture of step (b) a mixture containing nitrobenzene and at least one di- or trialkylamine containing 12 to 40 carbon atoms, the amount of alkylamine and the reaction time and temperature being sufficient to convert the azo- or azoxystilbene dye completely into the corresponding ammonium salt;
   (d) conducting a second cation exchange by adding to the nitrobenzene phase an aqueous solution of a mono-, di- or trialkanolamine containing 2 to 4 carbon atoms in each alkyl moiety, the amount of alkanolamine and the time and temperature of the reaction being sufficient to induce transfer of substantially all of the dye from the nitrobenzene phase to the water phase; and
   (e) separating the aqueous dye solution from the nitrobenzene phase.

2. The process of claim 1, wherein a trialkylamine containing a total of 12 to 25 carbon atoms is used for the first cation exchange reaction.

3. The process of claim 1, wherein tributylamine or tri-n-octylamine is used for the first cation exchange reaction.

4. The process of claim 1, wherein the second cation exchange reaction is carried out with a $C_2$–$C_4$ dialkanolamine.

5. The process of claim 4, wherein the second cation exchange reaction is carried out with diethanolamine.

6. The process of claim 5, wherein the sparingly soluble dye salt is converted into the readily water-soluble diethanolammonium salt via the lipophilic tributylammonium salt.

7. The process of claim 5, wherein the sparingly soluble dye salt is converted into the readily water-soluble diethanolammonium salt via the lipophilic tri-n-octylammonium salt.

8. The process of claim 1, wherein the first cation exchange reaction is carried out direct from the preferably acidified reaction mixture resulting from the synthesis of the dye.

* * * * *